United States Patent [19]
Chipman et al.

[11] Patent Number: 6,072,570
[45] Date of Patent: Jun. 6, 2000

[54] IMAGE QUALITY MAPPER FOR PROGRESSIVE EYEGLASSES

[75] Inventors: Russell A. Chipman, Salem, Va.; Jonathan J. Drewes, Athens; James B. Hadaway, Madison, both of Ala.

[73] Assignee: Innotech, Roanoke, Va.

[21] Appl. No.: 09/116,295

[22] Filed: Jul. 16, 1998

Related U.S. Application Data

[60] Provisional application No. 60/053,824, Jul. 24, 1997.

[51] Int. Cl.[7] .................................................. G01B 9/00
[52] U.S. Cl. ........................ 356/124; 356/124.5; 356/127
[58] Field of Search ............................... 356/124, 124.5, 356/125, 126, 127; 33/200

[56] References Cited

U.S. PATENT DOCUMENTS

| | | | |
|---|---|---|---|
| 2,897,722 | 8/1959 | Gunter, Jr. et al. | 88/56 |
| 3,266,368 | 8/1966 | Santinelli | 88/56 |
| 3,445,665 | 5/1969 | Laughman | 250/208 |
| 3,572,939 | 3/1971 | Burdick | 356/126 |
| 3,877,788 | 4/1975 | Sprague et al. | 356/124 |
| 4,007,990 | 2/1977 | McDevitt, Jr. et al. | 356/124 |
| 4,077,721 | 3/1978 | Mohon | 356/124 |
| 4,213,701 | 7/1980 | Lanzilloti | 356/124 |
| 4,696,569 | 9/1987 | Geary et al. | 356/124 |
| 4,730,924 | 3/1988 | Allard et al. | 356/124 |
| 4,767,215 | 8/1988 | Borodovsky | 356/124 |
| 4,779,979 | 10/1988 | Iwane | 356/125 |
| 4,815,844 | 3/1989 | Schmalfuss et al. | 356/237 |
| 4,822,165 | 4/1989 | Schmalfuss et al. | 356/239 |
| 5,007,734 | 4/1991 | Wilms | 356/124 |
| 5,173,739 | 12/1992 | Kurachi et al. | 356/124 |
| 5,247,341 | 9/1993 | Kurachi et al. | 356/127 |
| 5,301,004 | 4/1994 | Percival et al. | 356/125 |
| 5,303,022 | 4/1994 | Humphrey et al. | 356/124 |
| 5,349,433 | 9/1994 | Iwane | 356/124 |
| 5,414,505 | 5/1995 | Ikezawa et al. | 356/127 |
| 5,416,574 | 5/1995 | Fantone | 356/124 |
| 5,500,732 | 3/1996 | Ebel et al. | 356/124 |
| 5,521,700 | 5/1996 | Kajino et al. | 356/124 |
| 5,581,347 | 12/1996 | Le Saux et al. | 356/124 |

FOREIGN PATENT DOCUMENTS

| | | | |
|---|---|---|---|
| 0238338 | 9/1990 | Japan | 356/124 |

*Primary Examiner*—Hoa Q. Pham
*Attorney, Agent, or Firm*—Christie, Parker & Hale, LLP

[57] ABSTRACT

An instrument and method for optical testing of an eyeglass lens, including progressive addition lenses, to obtain image quality measurements includes an illumination system for presenting a beam of light to a test lens, a test lens positioning system for rotating the test lens so that different areas on the lens are illuminated, a zoom lens for focusing the beam at a constant effective focal length, a detection system for recording and measuring image quality of the test lens, and an alignment boom for conveying the zoom lens and the detection system such that the optical axis remains aligned with the beam existing the test lens. The instrument is fully automated and capable of obtaining measurements of the power, astigmatism, prism and modulation transfer function at various locations on the surface of the lens.

28 Claims, 20 Drawing Sheets

IMAGE QUALITY MAPPER FOR
PROGRESSIVE EYEGLASSES

CROSS REFERENCE TO RELATED APPLICATIONS

This application claims priority of Provisional Patent Application Nos. 60/053,824 filed Jul. 24, 1997, the subject matter of which is incorporated herein by this reference.

FIELD OF THE INVENTION

The present invention relates to optical testing instruments and more particularly to an automated optical testing instrument capable of measuring the image quality over the surface of a progressive addition eyeglass lens.

BACKGROUND OF THE INVENTION

The optical design of a progressive addition eyeglass lens (PAL) involves steadily changing the power (inverse focal length) between different regions of the lens, giving the lens an image quality that changes over the lens surface. This change introduces large amounts of astigmatism along with significant amounts of other aberrations. Thus, a PAL, even if manufactured to reproduce the optical design perfectly, will have significant variations in image quality across the lens. Moreover, eyeglasses in general have defects associated with their manufacture, such as deviation from design curvatures, refractive index variations, bubbles, inclusions, and scratches which may also alter image quality. While these manufacturing defects are difficult to model, it is necessary to be able to measure them. With the rapidly-growing popularity of PAL's, a need exists for an optical testing apparatus that measures the variation in image quality of different designs to provide an objective comparison.

Currently, measurements of power, astigmatism and prism can be made manually at certain locations on a lens (generally with about a 3 millimeter subaperture diameter) using commercially-available lensometers, otherwise known as focimeters. Measurement of resolution is typically made using a test bench setup through the inspection of an image formed by a PAL of an Air Force bar target object at infinity using a microscope. While these instruments and methods do provide some basic information about the PAL, they fail to give precise, comprehensive image quality information that would be very useful to the PAI designer and/or manufacturer. Moreover, known instruments and methods do not allow for fully automated mapping of the power, astigmatism, prism and Modulation Transfer Function (MTF) over the entire surface of a PAL.

Consequently, a need exists for an improved optical testing instrument, and more particularly, an optical testing instrument that allows for fully automated mapping of the power, astigmatism, prism and MTF over the entire surface of a PAL.

SUMMARY OF THE PRESENT INVENTION

The present invention provides an improved instrument and method for measuring image quality of eyeglass lenses, including PALs, designed to overcome the disadvantages associated with the prior art. In a presently preferred embodiment, a fully-automated Eyeglass Image Quality Mapper is provided for measuring the power, astigmatism, prism and MTF at various locations across the surface of a spectacle or eyeglass lens. The instrument includes an illumination system for presenting a collimated beam of light of appropriate size to a test lens, a positioning system for rotating the test lens so that different areas on the lens are illuminated, a zoom lens for focusing the beam at a constant system effective focal length once it passes through a particular subaperture of the test lens, a detection system for recording and measuring the image quality of the lens, and an alignment boom for conveying the zoom lens and the detection system such that the optical axis of the zoom/detection system remains aligned with the beam exiting the test lens.

At a given subaperture on the test lens, the best-focus power, magnitude and direction of astigmatism, magnitude and direction of prism and MTF at best-focus are measured. The MTF is obtained through a Fourier transform of the measured point-spread function (PSF). A map of a lens is then constructed by sampling the lens at a plurality of subaperture locations. Surface, contour, and text plots are made of the power, astigmatism, prism and MTF, as well as astigmatism and prism vector plots.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 1:
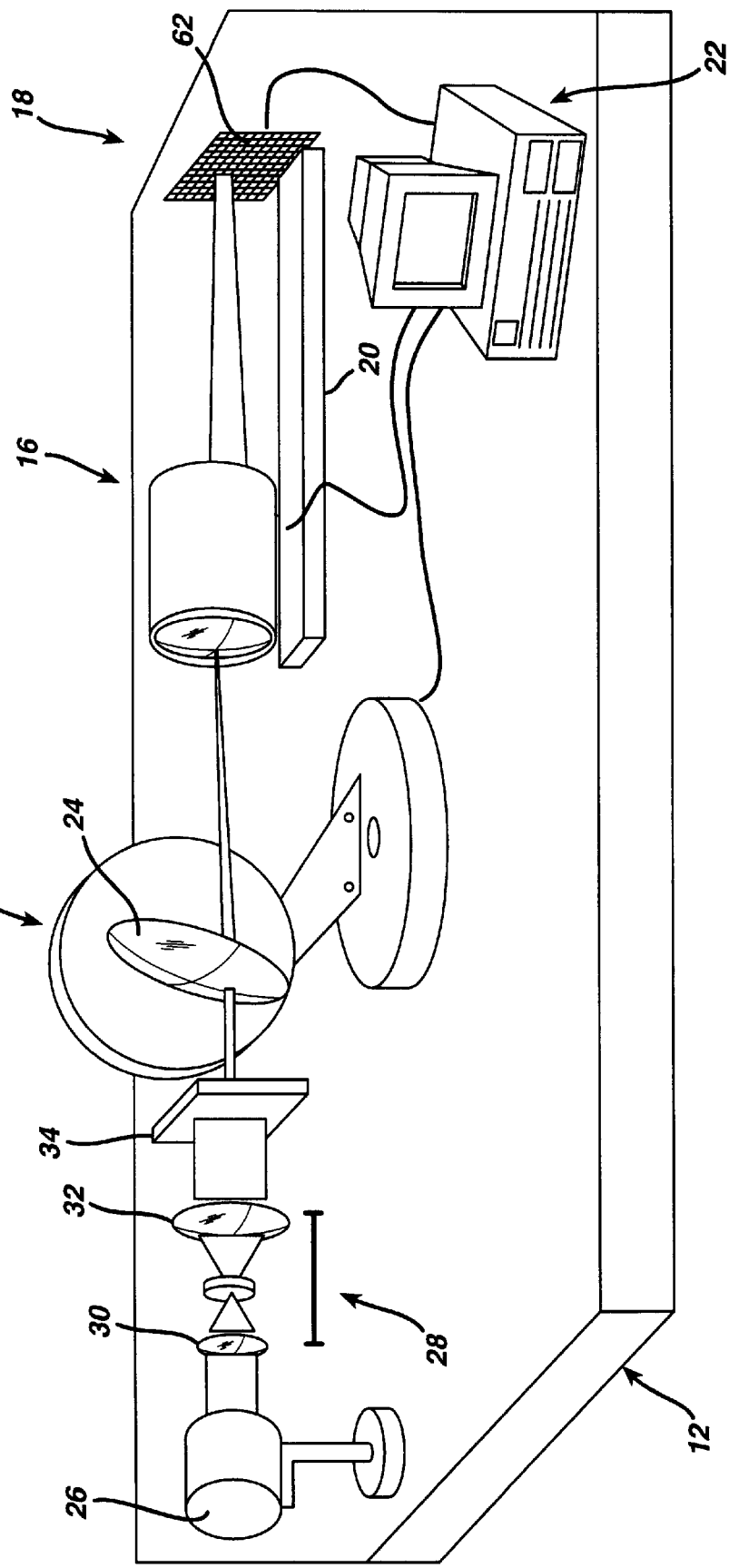
FIG. 1 is a schematic view of the Eyeglass Image Quality Mapper (EIQM) according to the present invention.

Referring now to FIG. 1, the optical testing instrument 10 or Eyeglass Image Quality Mapper (EIQM) according to the present invention generally includes: (a) an illumination system 12 for presenting a collimated beam of light of appropriate size to a test lens; (b) a test lens mounting/positioning system 14 capable of rotating the test lens so that different areas on the lens are illuminated; (c) a zoom lens 16 for focusing the beam at a constant system effective focal length (EFL) once it passes through a particular subaperture of the test lens; (d) a detection system 18 for recording and measuring the image quality of the lens; and (e) an alignment boom 20 for conveying the zoom lens and the detection system such that the optical axis of the zoom/detection system remains aligned with the beam exiting the test lens. Additionally, since one of the advantages of the present invention is that the EIQM is fully-automated, the instrument 10 is preferably coupled to a microprocessor- controlled computer system 22 for controlling the image quality mapper and analyzing the data obtained. Each of these components of the EIQM is described in more detail below. First, however, a brief description of the types of image quality measurements available using the system is provided.

I. Measurements of Image Quality

A. Best-Focus Power

The power of a PAL is determined from the position of the zoom lens that yields the best image quality. During testing, the zoom lens is moved through a range of positions and the image quality is measured at each position. A useful indication of image quality is the Point Spread Function produced by a lens.

1. Point Spread Function

Figure 2:
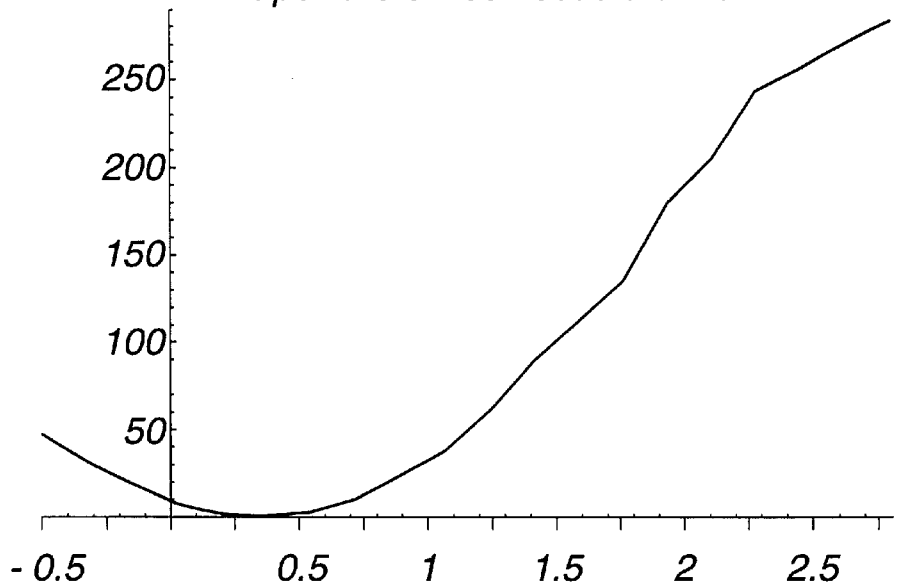
FIG. 2 is an exemplary plot of radial variance versus test lens power, generated by the EIQM of FIG. 1 and used in the measurement of best-focus power.

One of the unique features of the EIQM is its ability to measure the Point Spread Function (PSF) produced by a subaperture of the test lens. The PSF is a measurement of light intensity distribution. In general, a smaller PSF indicates a better image quality than a larger PSF, as larger PSFs result from higher aberrations in the lens. One useful measure of the size of a PSF is the radial variance, which describes the size of the light distribution about its mean position. The following procedure describes how the radial variance can be calculated. First, the centroid of a given image is found. The radial variance is a measure of how tightly the light is distributed about the centroid as a function of the radial distance from the centroid. This quantity, or rather, its root-mean-square (RMS), is widely used in both lens design and lens testing to find the location of best-focus. After the radial variance is found for each of a plurality of images taken through focus for a given subaperture on the test lens, a polynomial is fit to the data, and the power of the zoom lens where the radial variance is a minimum is recorded. This power is the best-focus power, and this is where the final PSF is recorded. A plot of the radial variance versus power is illustrated in FIG. 2. One can see a clear minimum in the radial variance at about 0.35 D. The analysis software used in the EIQM has fit a curve to the data and calculated the minimum to be at 0.3449141 D. This is the best-focus power.

B. Astigmatism

The EIQM is also capable of making astigmatism measurements for PALs, both in terms of magnitude and in terms of orientation. When there is significant astigmatism at a particular location on the test lens, two line images will be formed, one at one power setting and one at another. The difference in power between the two line images is defined as the astigmatism magnitude. The angle of the lower-powered line image gives the angle, or axis, of astigmatism.

Figure 3:
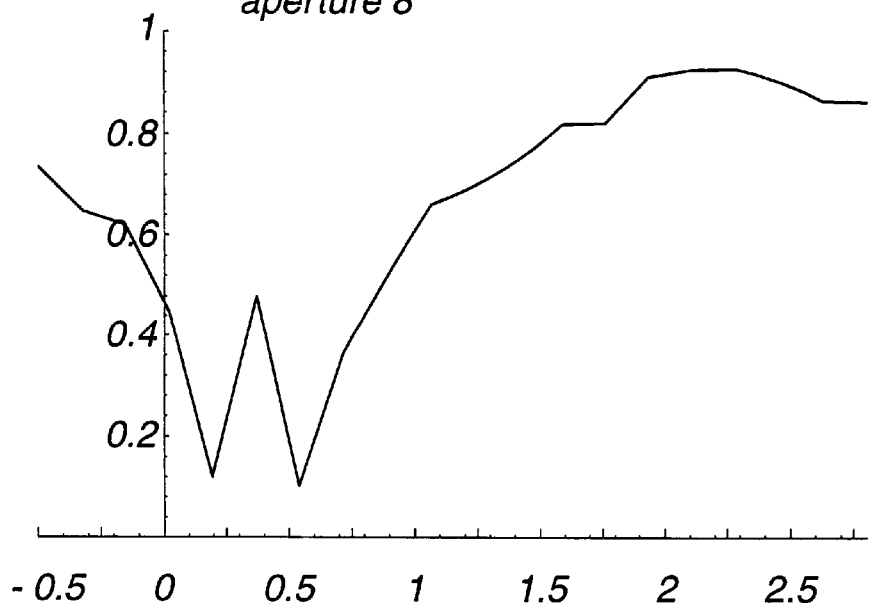
FIG. 3 is an exemplary plot of the ratio of maximum image width to minimum image width versus test lens power, generated by the EIQM of FIG. 1 and used in the measurement of the magnitude of astigmatism.

To determine the locations of the line images, a measure of the image width in one direction is used, rather than the two-dimension radial variance used to find best focus. If the one-dimensional image width along a line through the centroid of an image is measured as a function of the line's angular orientation, a maximum width (along the line image) and a minimum width (across the line image) will be obtained. The ratio of minimum width to maximum width for the plurality of through-focus images taken at a given subaperture on a lens may be plotted against power, as seen in FIG. 3. This ratio varies from 0 for a line image, to 1 for a circular image. Therefore, when there is astigmatism, the two locations on the plot where the ratio approaches 0 correspond to the two line foci. From these two locations, one can calculate the astigmatism magnitude using the difference in power.

Referring to FIG. 3, one can see the two minima corresponding to two distinct line foci. The difference between them is about 0.35 D. This is the astigmatism magnitude. The analysis software used in the EIQM fits a curve to the data around each minimum to more accurately determine the astigmatism.

For pure astigmatism, the best-focus power is found halfway between the two line foci. however, when other aberrations are present (e.g. spherical aberrations, coma, etc.), the location of the best-focus power may not be exactly at the midpoint and should be found using the minimum radial variance discussed above.

C. Prism

Another important characteristic of PALs that the EIQM is capable of measuring is lens prism. Lens prism is a measure of how much a beam is deviated from its original path after passing through a certain point on the lens. The customary unit of measure is the prism diopter, which is defined as the lateral displacement of the beam, measured in cm. from its original location on a surface that is 1 m behind the lens. In other words, 1 prism diopter equals 10 milliradians of angular deviation. The EIQM determines the prism at any test location simply by recording the angular position of the boom with respect to the on-axis or zero position (see FIG. 6B).

D. Modulation Transfer Function

Another unique aspect of the EIQM is its ability to make Modulation Transfer Function (MTF) measurements. Once the EIQM has measured the PSF produced by a lens as described above, a Fourier transform is performed on the PSF to get the MTF. The MTF is the magnitude of the Fourier transform of the 2-dimensional PSF. MTF is generally plotted against spatial frequency in cycles/mm. MTF can also be plotted versus angular frequency in cycles/mrad.

In a focusing system, this is done by multiplying the spatial frequency values by the focal length of the system. In one embodiment of the invention, the EIQM plots lens MTF versus angular frequency, since visual acuity is generally expressed in angular units. In order to make evaluation of a given lens's MTF easier, several slices through the center of the PSF are usually plotted. Generally, four slices at different spatial orientations or angles are plotted, such as the 0,45,90, and 135 degree slices.

Using the procedure described above the MTF is simultaneously obtained for all spatial orientations and all spatial frequencies up to the Nyquist limit of the detector used to record the PSF. For example, in a prototype of the EIQM, the detectors are 19 microns wide, so the highest spatial frequency that can be detected is $1/(2 \times 0.019 \text{ mm})=26.3$ cyc/mm. With a system focal length of 600 mm, this translates to $0.6 \text{m} \times 26.3$ cyc/mm=15.8 cyc/mrad. Since the best a lens can do with a 5 mm pupil is $D/\lambda=5\text{mm}/543\text{nm}=9.2$ cyc/mrad, the detector is more than adequate to record all spatial or angular frequencies.

II. Illumination System

The EIQM begins with an illumination system 12 designed to present a collimated beam of appropriate size to the test lens 24 from a light source 26. In one embodiment of the EIQM, a 543 nm green He—Ne laser is used as the source and is spatially filtered using a 5 micron pinhole. A non-limiting example of a suitable laser for use in the EIQM is as 1mW, linearly-polarized 543 nm green He-Ne laser available from Melles Griot, Irvine, Calif.

It should be noted that a broadband source such as a white-light source (e.g. a quartz halogen lamp) or a light emitting diode (e.g. a green LED) may alternatively be used as the light source. In those alternate embodiments, a narrowband interference filter (e.g. a 550 nm filter) can be used to select the test wavelength. Using a laser as a light source offers certain advantages over a broadband light source, including easier alignment, more power, and a more uniform beam. However, because the laser produces so much power, a neutral density filter is preferably located in the illumination system in order to attenuate the beam and prevent saturation of the detection system.

During initial testing of the EIQM, the spectral bandwidth of the light source was originally set to 550±10 nm using a broadband light source and a filter, since most eyeglass testing is done at or near 550 nm in order to provide consistency throughout the field.

Subsequently, it was determined to change to the 543 nm laser.

A collimator 28 is then used to present a collimated beam to the test lens. In one embodiment, the collimator includes a 20×microscope objective 30, followed by a pinhole, and then an achromatic lens 32. The achromatic lens 32 used in a prototype of the EIQM is an achromatic doublet that is a combination of a low-dispersion, positive element and a high-dispersion, negative element, cemented together to form a positive lens having essentially no dispersion in the visible spectrum. In addition to exhibiting lower chromatic aberration, achromatic doublets exhibit significantly lower amounts of other aberrations (spherical aberration, coma, astigmatism, etc.) than singlets. Those skilled in the art, however, should realize that other lens, such as an aspheric singlet or an air-spaced doublet, may alternatively be used for collimation. Suitable components for the collimator described above are available from Newport, in Irvine California and Spindler-Hoyer, in Milford, Mass.

The diameter of the collimated beam is set using an adjustable aperture 34. For example, the beam may be set using one of four apertures (2,3,5, and 7 mm) in a sliding plate. These beam diameters cover the typical range of pupil sizes for the human eye under different illumination conditions. Testing with smaller pupil diameters can be done to either simulate bright viewing conditions or simply to obtain an image quality map with finer detail across the test lens. Testing with larger pupil diameters will simulate darker viewing conditions. Alternatively, an adjustable aperture wheel or adjustable iris can be used in place of the adjustable aperture plate to set the diameter of the beam.

III. Test Lens Mounting/Positioning System

The lens 24 under test follows the illumination system, is held by a mounting/positioning system 14, and is illuminated by the collimated beam. A primary objective of the EIQM is to model the way in which the eyeglass lens is used by the human eye. The human eye has a center of rotation, and as the eye rotates, light passing through the eyeglass lens and the pupil forms a set of beams which pivot about the eye's center of rotation. To simulate this, the mounting/positioning system is designed to rotate the lens about a rotation point 35 behind the back surface of the test lens. In a presently preferred embodiment, a 27 mm radius is used for the rotation of the test lens. The 27 mm radius has been selected because it is consistently used in the relevant literature as an average distance between the center of rotation of the eye and the back vertex of the eyeglass lens; however, the EIQM is capable of making measurements with a varying rotation distance.

Figure 4:
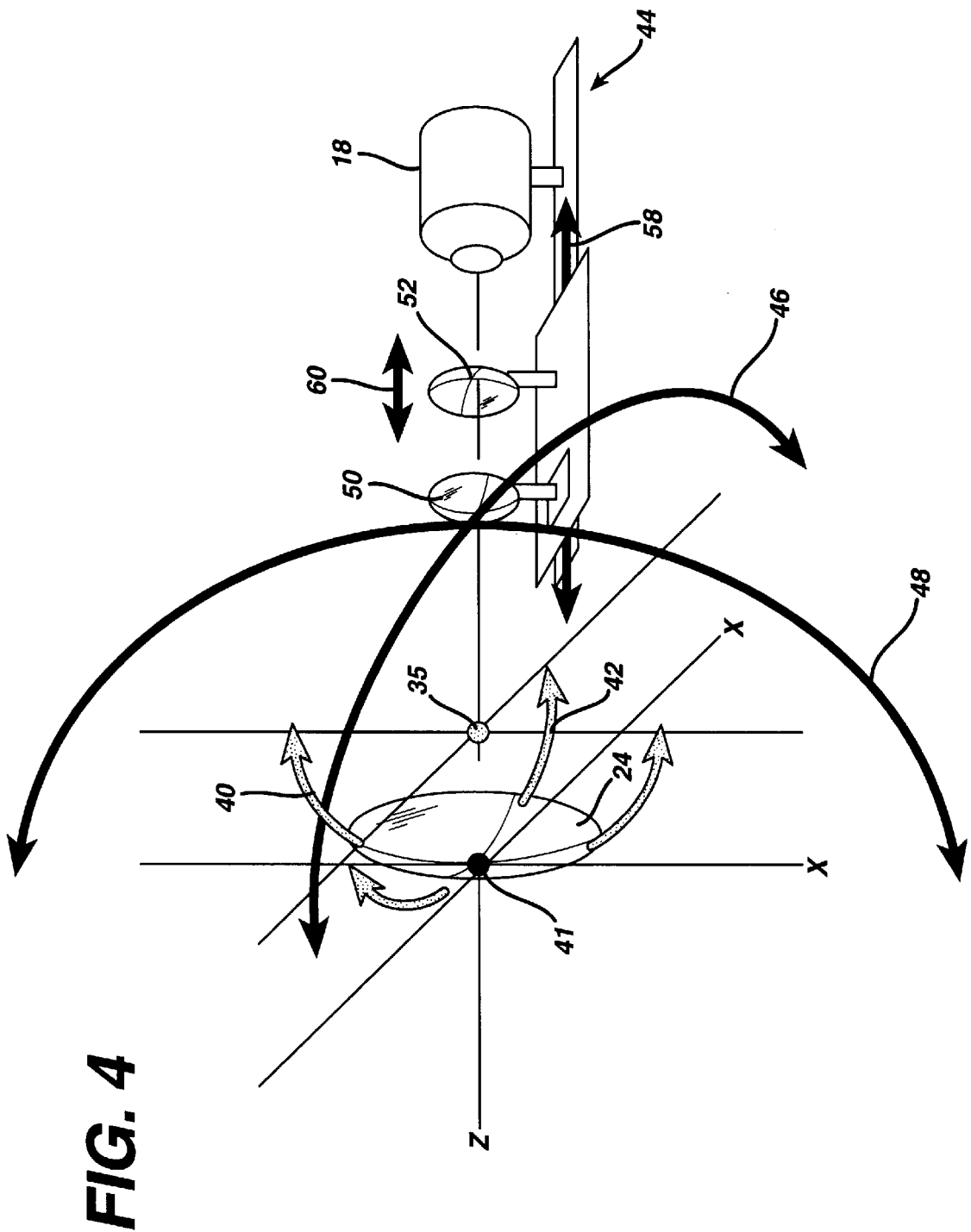
FIG. 4 is a schematic view illustrating the two rotation axes of the test lens mounting/positioning system, the two rotation axes of the alignment boom and the two linear movements of the zoom lens.

To allow for this rotation, a lens mount 36 is coupled to a two-axis rotary stage system used to position the test lens so that different areas on the lens are illuminated for measurement. In a presently preferred embodiment, the two-axis rotary stage system comprises two motorized rotary stages. Suitable low-capacity, motorized rotation stages are available from Velmex in Bloomfield, N.Y. The two-axis rotary stage system is designed such that, if the z-axis is the optical axis, the test lens is capable of rotating about a line parallel to the x-axis and a line parallel to the y-axis in order to simulate the human eye as described above. In FIG. 4, arrows 40, 42 indicate the two-axis rotation of the lens.

In one embodiment of the EIQM, a three-prong, self-centering lens holder is utilized for the lens mount (the test lenses are typically un-edged and usually about 76 mm in diameter). A set screw in the mount is used to prevent the prongs from exerting excessive force on the lens. A suitable 80 mm diameter, 3-prong, self-centering lens mount is available from Melles Griot in Irvine, Calif.

Figure 5:
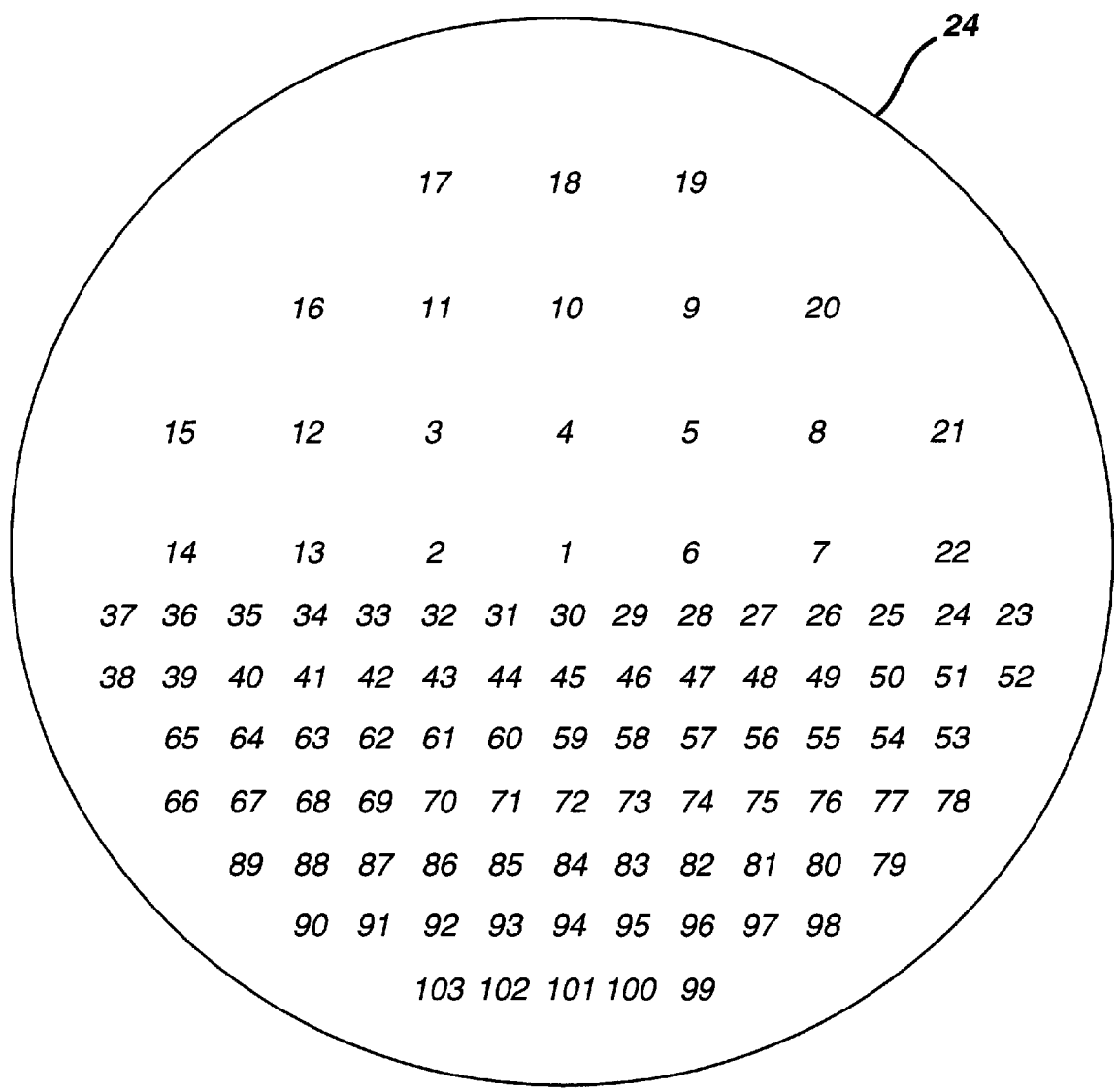
FIG. 5 is a schematic view of a PAL lens illustrating the plurality of locations or subapertures on the lens at which image quality measurements are made using the EIQM of FIG. 1.

The two-axis rotary stage system for the test lens mounting/positioning system is used to sequentially position the test lens at a pre-assigned list of locations or subapertures on the test lens for making image quality measurements. The specific locations on the test lens are determined by the properties of the lens being tested, the size of the test beam, and the information desired about the test lens. For example, with a typical PAL and a 5 mm diameter test beam, the EIQM has used 103 measurement locations that are spaced more coarsely in the upper distance zone and more finely around the transition and add zones (FIG. 5). The list of lens positions is simply a list of angles (a horizontal angle and a vertical angle for each position) provided to the computer. The angles define how the two-axis rotary stage system 38 should rotate about the eye rotation point for each position. At each lens position, the power, astigmatism (magnitude and angle), prism (magnitude and angle and MTF are calculated and used to measure the image quality across the lens.

When using a 3 mm diameter test beam, it can be desirable to increase the total number of measurement points (i.e. decrease the spacing between adjacent points) in order to more finely map the lenses. In any event, the spacing between measurement points should preferably be set such that the beam footprints on the lens do not overlap.

The above procedure is fully-automated and controlled by the computer 22 of the EIQM. The two rotation axes for the test lens are motorized with limit sensing switches and controlled by the computer. A list of lens positions where testing is to be performed is loaded into the computer. The computer directs the motorized rotary stage system 38 to position the lens sequentially at each of the positions specified so that the appropriate measurements may be taken before the lens is rotated to the next position.

IV. Alignment Boom

Figure 6A:
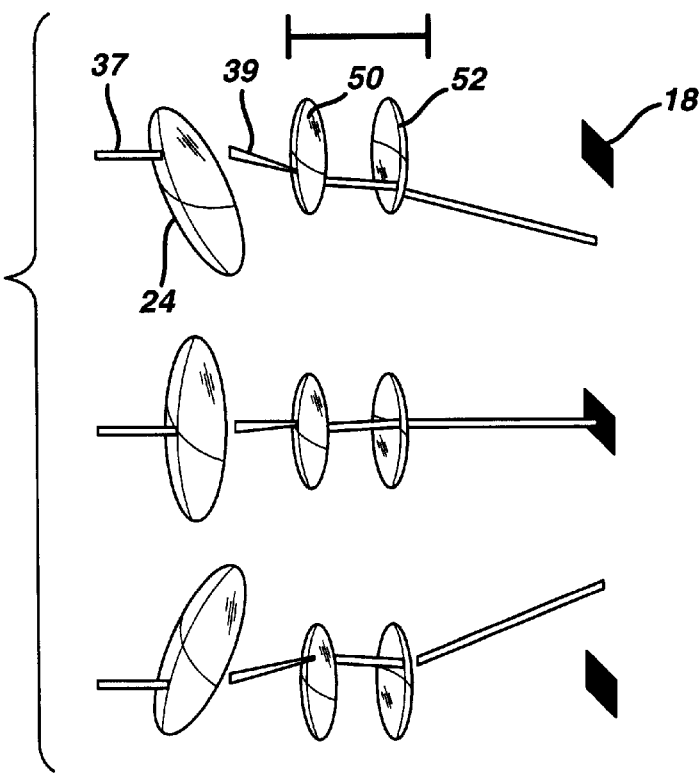
FIG. 6A is a series of schematic views of a test lens under rotation, illustrating the beam deviation resulting when the front and back surfaces of a PAL are not parallel to one another.
Figure 6B:
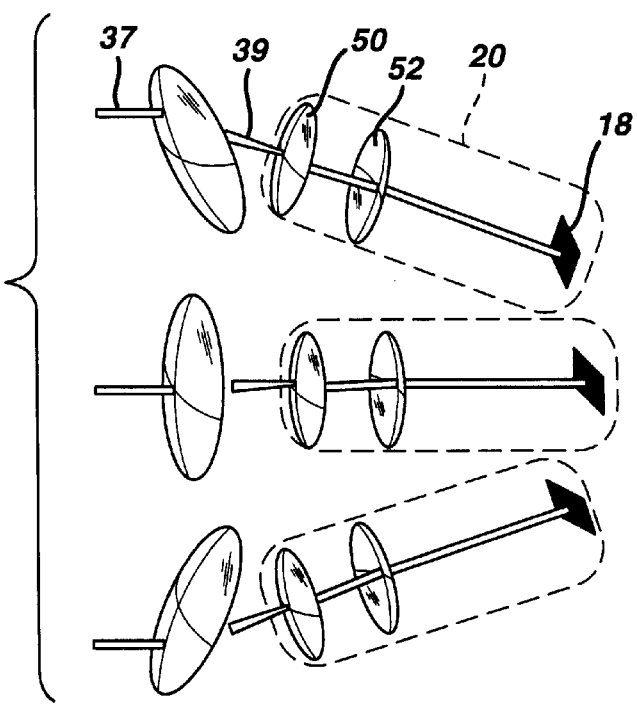
FIG. 6B is a series of schematic views of a test lens under rotation, similar to those of FIG. 6A, illustrating the use of a boom assembly in the EIQM of FIG. 1, whose rotation point is at the back surface of the PAL and that carries the zoom lens and detection system.

One significant complication occurs as a PAL is rotated in the manner described above. Referring to FIG. 6A, the test beam generally is not normally incident upon the front surface of the PAL. As the lens under test moves, the test beam is deviated about the back surface of the PAL and sweeps through a significant angle as it exits the lens. In other words, the incident collimated beam 37 and the beam refracted through the lens under test 39 are not parallel to each other.

The EIQM overcomes this problem by rotating the zoom lens/detector system on a boom about the point of beam deviation 41 at the test lens (FIG. 4). In other words, both the zoom lens and detector system are coupled to the boom and rotate together about the test lens so that light transmitted through the lens under test is transmitted along, or nearly along, the axis of the zoom lens and is incident near the middle of the detection system. After the test lens is moved to a new measurement point, the boom is rotated until the image is recentered on the detector.

To allow the zoom lens/detector system to align with and center on the beam emerging from the test lens the alignment boom is coupled to a two-axis rotary stage system. In a presently preferred embodiment, the two-axis rotary stage system comprises two motorized rotary stages. Suitable high-capacity motorized rotation stages are available from Velmex in Bloomfield, N.Y.

One of the challenges in designing the boom system was that stable, vibration-free motion over large angular travels was required. Most of the boom structure has been fabricated from aluminum to minimize weight, with steel brackets utilized to couple the boom to the rotary stages. Because of the fairly heavy cantilevered load, large commercial rotary stages were selected for the two-axis rotation of the boom. Additionally, a counter-weight was designed to protect the bearings in the elevation rotary stage against excessive wear due to eccentric loading.

In FIG. 4, arrows 46, 48 indicate the two-axis rotation of the boom. As described above, the operation of the boom system is fully-automated and controlled by the computer 22 of the EIQM. The two rotation axes for the boom are motorized with limit sensing switches and controlled by the computer. Once the test lens is rotated from one measurement point to the next, the boom is moved by the motorized two-axis rotary stage system 44 to recenter the image on the detection system. Sometimes, particularly with high power lenses, the beam will move completely off the active surface of the detection system as the lens is moved to the next measurement point. To prevent this, it may be necessary to track the beam. This refers to the practice of moving only part of the way to the next measurement point, stopping, adjusting the boom to recenter the image, and then proceeding until the next measurement point is reached without losing the beam. For the lenses that have presently been tested with the EIQM, only two steps were necessary between any two measurement points; however, for higher power lenses more steps may be necessary to avoid losing the beam.

Other means of addressing the beam deviation problem can alternatively be used to replace the boom system. For example, an adjustable prism can be placed directly behind the lens to bring the beam back onto the original axis, or a wide field-of-view zoom lens can be used to capture the exiting light beam without the need for movement of the detection system.

V. Zoom Lens

Measuring image quality is further complicated because PALs have a spatially varying power or focal length. That is, different parts of the lens focus at different distances from the progressive lens. Furthermore, some test lenses may have negative powers. Thus, an accessory optical system is used to bring the light to focus. While the problem of varying power could be overcome by using an adjustable translation system to move the detection system along the optical system to focus the image during testing, this is an expensive and complex solution. Moreover, if the power of the PAL varies but the power of the focusing lens is fixed, then the effective focal length (EFL) of the optical system consisting of the PAL and the focusing lens also varies. The size of a PSF for a given amount of aberration varies in proportion to the system $EFL_s$. Therefore, if the system EFL varies, direct comparison of PSFs from various locations on the lens becomes difficult.

To address this problem, a unique zoom lens is designed to focus the beam onto the detection system at a constant system EFL. This allows the detection system to be positioned at a fixed distance from the PAL. Additionally, since the system EFL remains constant for any test location on the PAL, scaling of the PSFs for direct comparison is avoided.

In a presently preferred embodiment, the zoom lens includes two elements, a positive achromat 50 followed by a biconcave singlet 52. Suitable elements for the zoom lens, including an 80 mm EFL achromatic doublet lens and a −20 mm EFL biconcave lens, are available from Spindler-Hoyer in Milford, Mass.

Additionally, the zoom lens includes two motorized linear translation stages mounted on the boom. The front, achromat lens of the zoom is coupled to a first, longer stage, while the rear biconcave lens is coupled to a second, shorter stage, which itself is coupled to the longer stage. This arrangement provides for the adjustment of axial spacing between the PAL and the achromat, and between the achromat and biconcave lens independently, so that the system EFL can be kept constant for varying PAL powers. In other words, the linear stages allow the two elements of the zoom lens to move along the optical axis through their centers when zooming, to keep the system EFL constant. Suitable motorized linear translation stages are available from Velmex in Bloomfield, N.Y.

Figure 7:
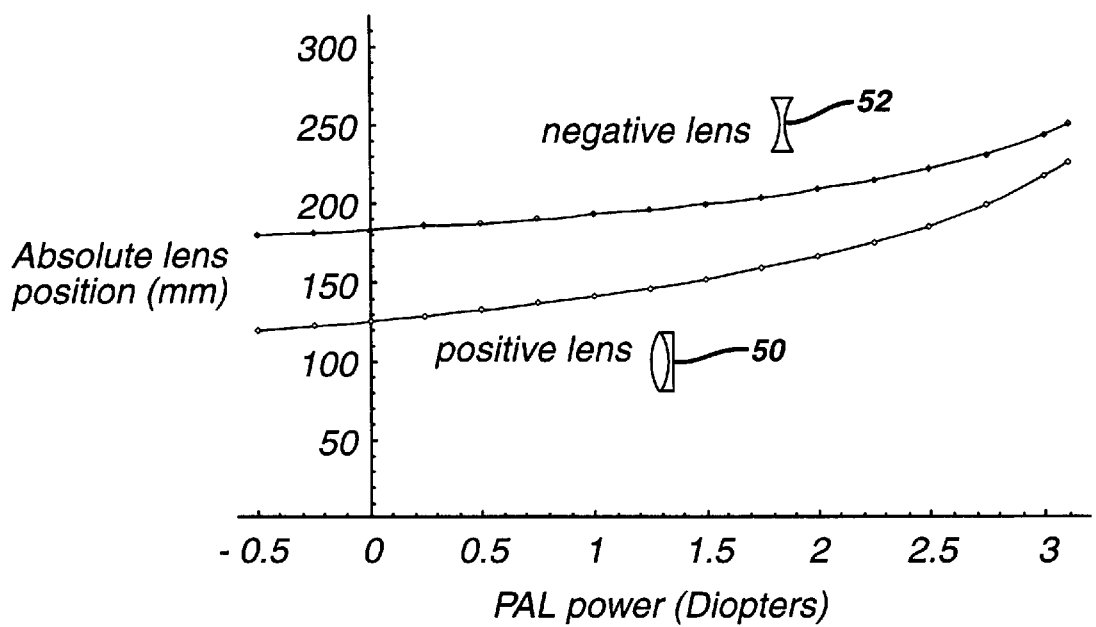
FIG. 7 is a plot of zoom lens position versus test lens power for the EIQM of FIG. 1. for each of the lenses comprising the zoom lens.

In a presently preferred embodiment, the zoom lens is used to focus the beam on the detection system at a constant system EFL of 605 mm. This focal length produces a diffraction-limited PSF that is large enough for accurate sampling by the detection system. The zoom lens presently utilized in the EIQM can accommodate any PAL power in the range of −0.5 to+2.8 diopters. The zoom system was designed in CodeV™, of Optical Research Associates, Pasadena, Calif. by optimizing the axial locations of the two zoom lenses for a series of paraxial lenses of different powers located at the test lens position such that the entire system EFL remained at 605 mm with good image quality (on an image plane fixed with respect to the PAL). Thirteen lens powers (giving 13 different zoom positions) were used to obtain enough data to fit a high-order polynomial to the individual paths of the zoom lenses. The paths along which these zoom lenses move with respect to the test lens are nonlinear, as shown in FIG. 7.

In FIG. 4, arrows 58 and 60 indicate the linear translation of the zoom lens and its individual elements. As described above, the operation of the zoom lens is fully-automated and controlled by the computer 22 of the EIQM. The two linear translation axes for the zoom lens are motorized with limit sensing switches and controlled by the computer. Once the boom is rotated to bring the optical axis of the zoom lens substantially parallel with the beam of light exiting the lens under test, the zoom lens is moved through a plurality of designated test positions for each subaperture on the lens, and the image quality is measured by the detection system.

Those skilled in the art should realize that other lens designs are possible for the zoom system. For example, a three element zoom lens with a larger power range is presently being developed for the EIQM.

VI. Detection System

Several different methods and detection systems can be utilized with the EIQM for measuring image quality. In a presently preferred embodiment, the detection system includes a camera 62 for measuring the light intensity distribution, commonly referred to as the PSF.

The camera utilized in the detection system is preferably a charge coupled device (CCD) camera, which is made up of a two-dimensional array of pixels or detectors. The true PSF of an optical system is a continuous, two-dimensional distribution of light intensity. However, when a CCD is used to measure the PSF, a discreet, two-dimensional array of intensity values are obtained, one for each pixel. The spacing and size of the pixels used to sample the PSF must be taken into account when performing calculations on the PSF, such as those used to obtain the MTF.

Another type of array detector that can be used is a charge injection device (CID). The primary requirements of the array detector are that it have very low noise and a large dynamic range so that the fine features of the PSF can been seen. An accurate PSF leads to an accurate MTF. In a presently preferred embodiment, a 512×512, 14-bit, cooled CCD camera is used with the EIQM. A suitable CCD camera for use in the EIQM is available from Photometrics in Tuscon, Ariz.

In an alternate embodiment, the detection system is a scanning knife edge in front of a single element detector to measure the Line Spread Function (LSF) of an image. The LSF provides a measure of the width of the image along one axis. Single element detectors, such as a silicon photodiode, photomultiplier tubes, thermoelectric detectors, and thermopile detectors, have a single detecting surface with only one output, not an array of detectors like a CCD, and cannot, by themselves, give the spatial distribution of an image. Thus, a knife edge, slit, or pinhole must be moved through the image in front of such single-element detectors while their output is sampled in order to determine the spatial distribution of the light.

Furthermore, the MTF for a single orientation but at all spatial frequencies can be obtained from a Fourier transformation of the LSF. Generally, the scanning knife edge test must be repeated for several orientations (e.g. 0, 45, 90, and 135 degrees) of the knife edge in the transverse plane to obtain a representative data set of the image quality. Best-focus can be located by repeating a set of four LSF measurements as a set of planes along the optical axis, and locating the plane where the average LSF width is minimized. The same data set can be used to determine the magnitude and orientation of the astigmatism.

In another embodiment, the detection system includes an interferometer capable of measuring image quality associated with a beam near focus, such as a shearing interferometer or a Smartt Point Diffraction Interferometer (PDI). These interferometers measure the wavefront aberration associated with an image by interfering two wavefronts derived from the same light source. From the wavefront aberration measurement, the root mean squared (RMS) wavefront aberration can be determined. Best focus can be determined by finding the plane where the RMS wavefront aberration is minimized.

In a presently preferred embodiment, all of the EIQM components are mounted to an aluminum baseplate. A black plexiglass, light-tight enclosure has been designed to cover the system during operation. On the top of the cover is an access panel that provides access to the test lenses.

VII. Calibration of the EIQM

After assembling and aligning the system, the EIQM should be calibrated. To that end, following the initial system assembly and alignment, the EIQM was checked for measured power, image quality/MTF, image centering, and system EFL through the zoom range using a series of high-quality laboratory lenses. The measured powers were all within 1% of the certified values, the images were all diffraction-limited, and remained centered through-focus for each lens to within±20 pixels, and the system EFL remained constant to within±5 mm. The EFL of the system was measured through the zoom range using a 300 line/inch grating placed before the calibration lenses. The separation of the 0 and±1 orders on the CCD were then used to calculate the EFL.

Next, the instrument was checked for measured astigmatism. Two single-vision lenses with 1.0D of prescribed astigmatism were used. The astigmatism at the geometrical center of each lens was first measured with a high quality lens testing bench to an accuracy of±0.05D. The astigmatism values measured by the EIQM were within±0.1D of the calibrated values.

Instrument PSFs/MTFs were then taken, with no test lens in place and the zoom set to 0 D, for all bin settings (1, 2, 4, & 10) (see Section VIII). The instrument was found to be diffraction-limited for bin factors of 1 & 2. The aliasing of the measured MTFs for bin factors of 4 & 10 matched those predicted by theory. However, with the bin-selection rules used, the cut-off frequency for any image should be well below the aliasing frequency for the binning used.

The above calibration procedure is preferably carried out an a periodic basis to insure continuing instrument accuracy.

VIII. Exemplary Testing Procedure using the EIQM

Uncut test lenses are received with markings indicating the locations of the optical center, the add or reading zone, as well as the proper horizontal orientation of the lens. Using these marks, a series of alignment marks is made along the edge of the lens so that the factory markings can be removed from the face of the lens. The lens is then mounted in the EIQM in its normal orientation using the edge marks as a guide. The desired test aperture diameter is then set. The cover is then closed and the main instrument control program is run. The first step in the program is to initialize all stages. Limit switches are used to home the stages with the PAL then set to the first test point (at the geometrical center of the lens), the zoom system set to −0.5 D, and the boom adjusted to center the image on the CCD.

Figure 8:
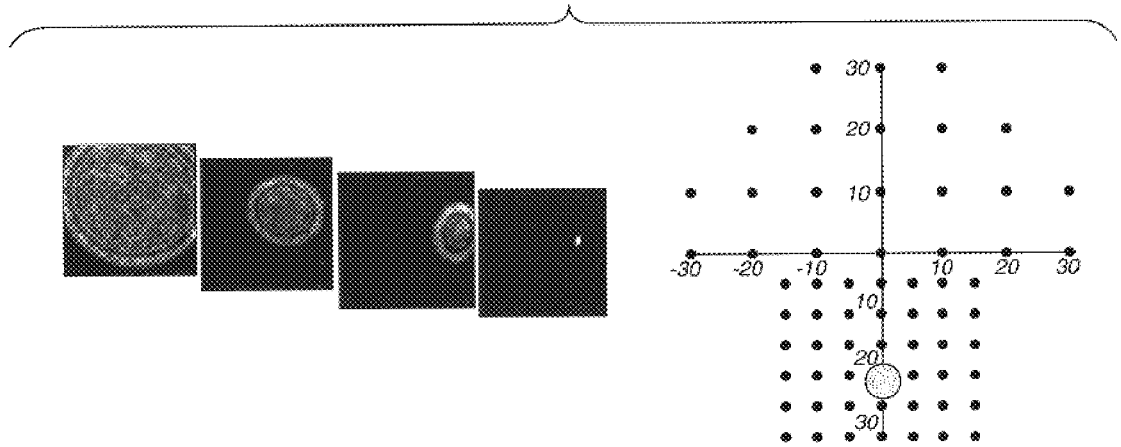
FIGS. 8 and 9 are examples of through-focus images of a minimally astigmatic region and an astigmatic region of the PAL, respectively, generated by the EIQM of FIG. 1.
Figure 9:
Figure 9:
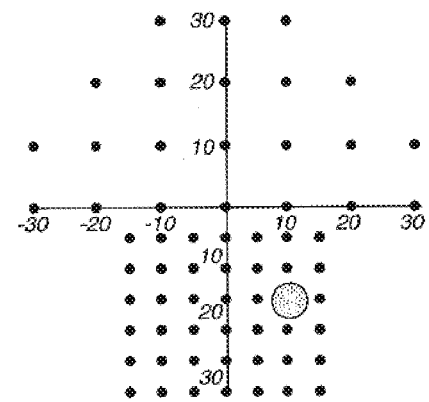

At each of the test points or subapertures, 20 images are taken, equally-spaced throughout the −0.5 to±2.8 D range of the zoom optics. For each of the through-focus images acquired (see FIGS. 8 and 9 for examples), the following parameters are automatically recorded or calculated: power corresponding to zoom position, image centroid location, radial variance of image, image widths along and across a line fit to the image (for measurement of astigmatism), angle of line image, maximum pixel value, and the sum of all pixel values. The location of best-focus is calculated from the through-focus radial variances. A parabola is fit to the data surrounding the minimum radial variance of the 20 measured through-focus (see FIG. 2). The minimum of this fitted curve is then the best-focus (in diopters) for this subaperture. The zoom system is then moved to this position, the power recorded, and a PSF image taken. The angular position of the boom is also recorded to determine the prism.

Figure 10:
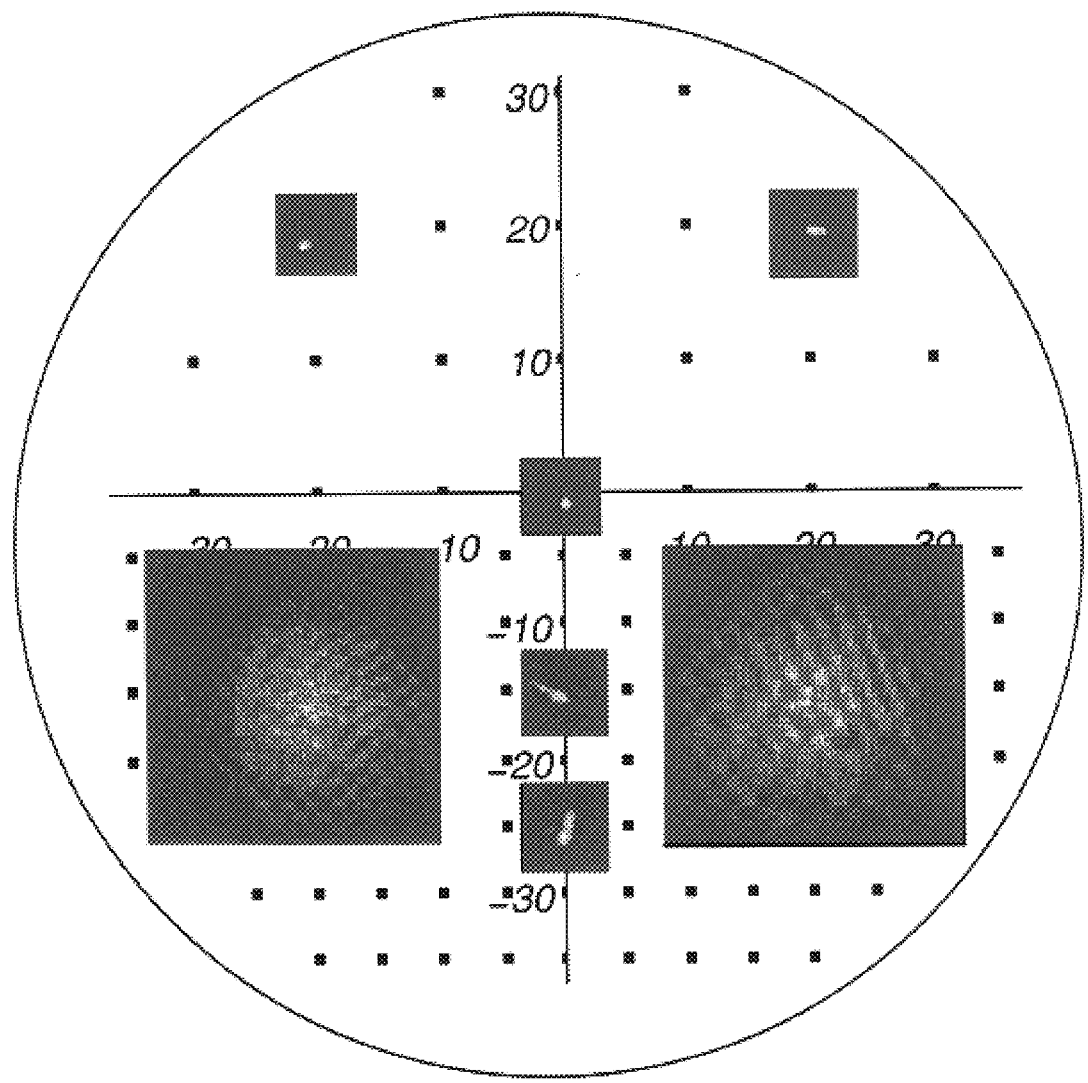
FIG. 10 is a schematic view of a PAL, illustrating the PSF over the surface of the lens at various locations.

Depending upon the size of the best-focus image (as determined by the radial variance), the final image taken may be binned (up to a factor of 10). Binning sums adjacent pixel values so as to yield a smaller image grid. During initial testing, all images taken were appropriately binned to output a 50×50 grid for analysis. When a binning factor of one is used, only the central 50×50 pixels of the CCD are used. This gives the highest resolution for smaller images. When a binning factor of 10 is used, the entire active area of the CCD is used, but with less resolution. This is done for larger, highly-aberrated images. FIG. 10 shows the extent to which the best-focus image can vary across a typical PAL. The binning is set to avoid any degradation (i.e. aliasing) in the MTF to be subsequently calculated from the PSF.

The PAL is then moved to the next test point, the image recentered on the CCD, and the process repeated. For tracking/centering, the entire 512×512 active area of the CCD (binned 10 times in each direction) can be used. Testing can be performed at any desired set of locations over the PAL. FIG. 5 shows an exemplary map that consists of 103 subaperture. A more dense sampling is preferably used in the lower portion of the PAL, where the image quality changes For initial testing, the entire testing sequence has been controlled by a VisualBasic™ program which interacts with the motor controller and detection system. To complete a test run with 103 subapertures, it presently takes approximately two hours. The resulting output consists of an ASCII test file containing all of the through-focus data for each subaperture, and a PSF image file for each subaperture.

IX. Data analysis the EIQM

As mentioned above, the power for each test subaperture is calculated and recorded during testing. Further data analysis is then performed in order to determine the astigmatism (magnitude and orientation), prism (magnitude and orientation) and MTF at each subaperture. The data obtained can then be plotted to produce a lens map for easy interpretation.

For initial testing, only PALs with no prescribed astigmatism were used, so as to measure only the unwanted astigmatism present in the lenses. The through-focus line image width data is used to determine the location, in diopters, of the two line images formed by an astigmatic region of the PAL. This line image width is the image width across a best-fit line divided by the image width along this line. This gives a value of 0 for a perfect line, and a value of 1 for a perfect circle. For astigmatic images, a plot of this line image width as a function of power yields a curve with two minima located at the two astigmatic line foci (see FIG. 3). The diopter difference between the minima locations gives the magnitude of astigmatism. The angle of the lower-powered line image gives the angle, or axis, of astigmatism.

The magnitude and direction of the local lens prism is calculated from the angular positions of the two boom stages. The boom positions are in degrees, and are converted to prism diopters for display.

Next, a 2-dimensional Fourier transform is performed on each individual PSF to yield the MTF of that subaperture. The MTF is calculated, with proper scaling, as a function of angular frequency (e.g. cycles/mrad). The value of the MTF (normalized to the diffraction-limited value) at an angular frequency corresponding to 20/20 vision (one arc minute line widths) is then saved for each subaperture.

From this numerical data, 2-D and 3-D contour plots, or maps, of the power astigmatism magnitude, prism magnitude, and normalized 20/20 MTF across the surface of the PAL are generated (see FIGS. 11–14). Vector plots of the astigmatism axis and prism direction are is also generated (see FIGS. 11C, 11E and 12C, 12E). Furthermore, the numerical data can be plotted as a function of subaperture location (see FIG. 14C).

The data analysis and plotting described above has been performed using Mathematica 3.0.1 ™ and requires approximately ½ hour per lens. Those skilled in the art, however, should realize that other suitable programs can be used to perform the necessary data analysis.

X. Example Lens Maps Generated by the EIQM

A wide variety of lenses have been tested with the EIQM. In this section, examples of the instrument's output are given. The PALs used for this test, labeled "LENS A" and "LENS B", were obtained from different vendors, with both lenses designed to have 0 D distance correction and+2 D addition power. It should be noted that the contour plots are usually generated and printed in color for easy interpretation, however, the plots included herein are in black-and-white and are thus more difficult to read. Nevertheless, the general features are still quite visible.

Figure 11A:
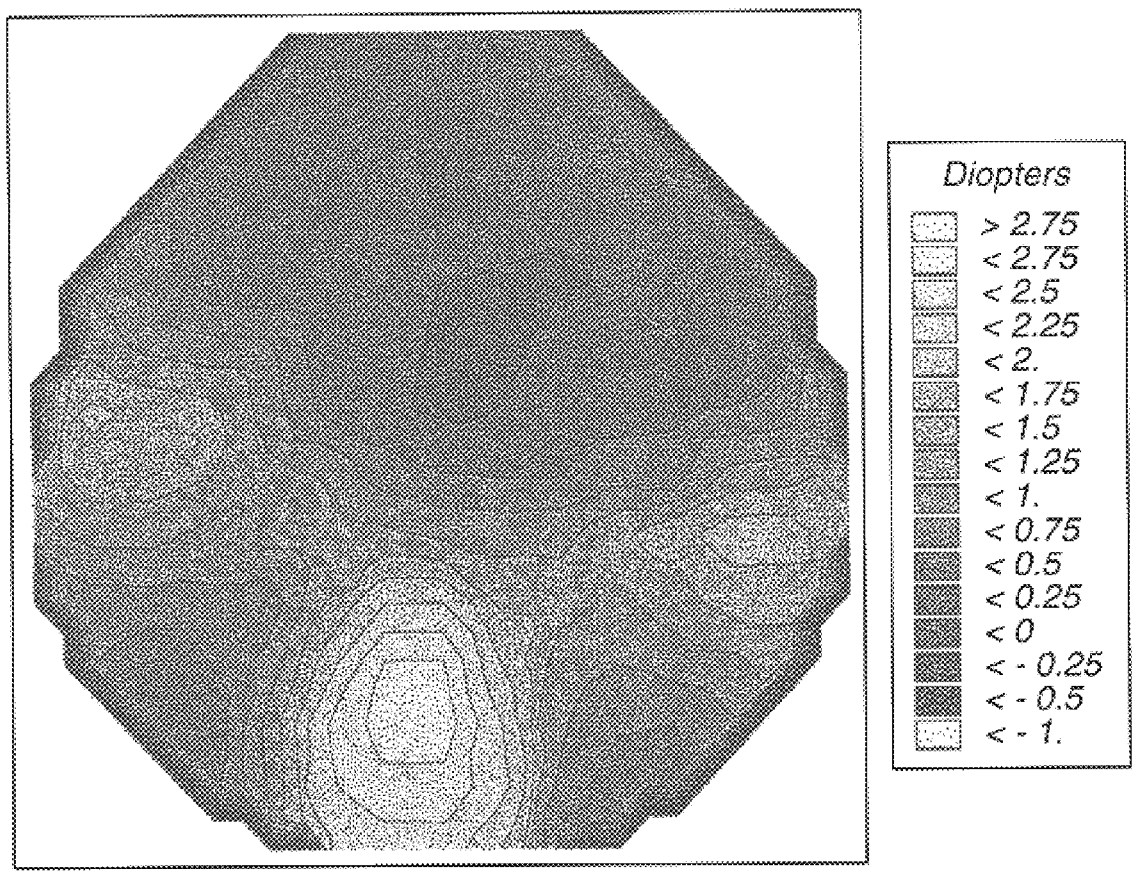
FIGS. 11A, 11B, 11C, 11D, 11E and 11F, respectively, are a contour plot of the best focus power, a contour plot of the astigmatism magnitude, a vector plot of the astigmatism angle, a contour plot of the prism magnitude, a vector plot of the prism angle, and a contour plot of the normalized MTF at 20/20 for LENS A, generated by the EIQM of FIG. 1.
Figure 11B:
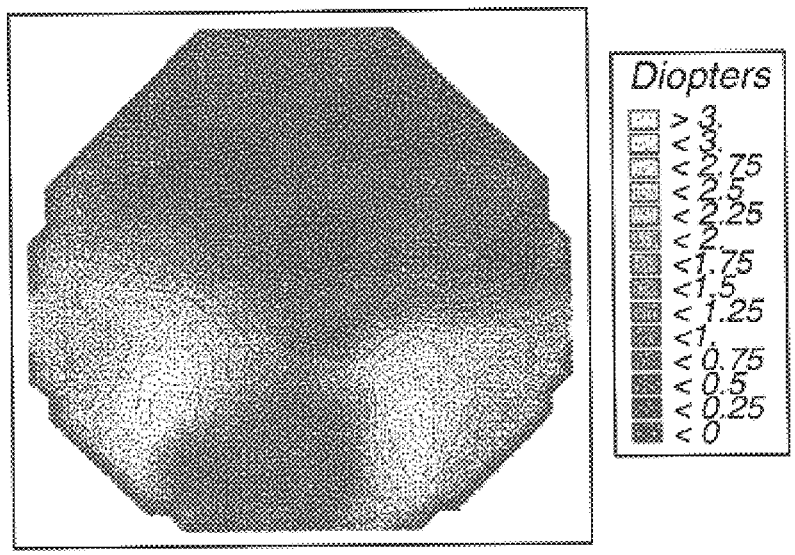
Figure 11C:
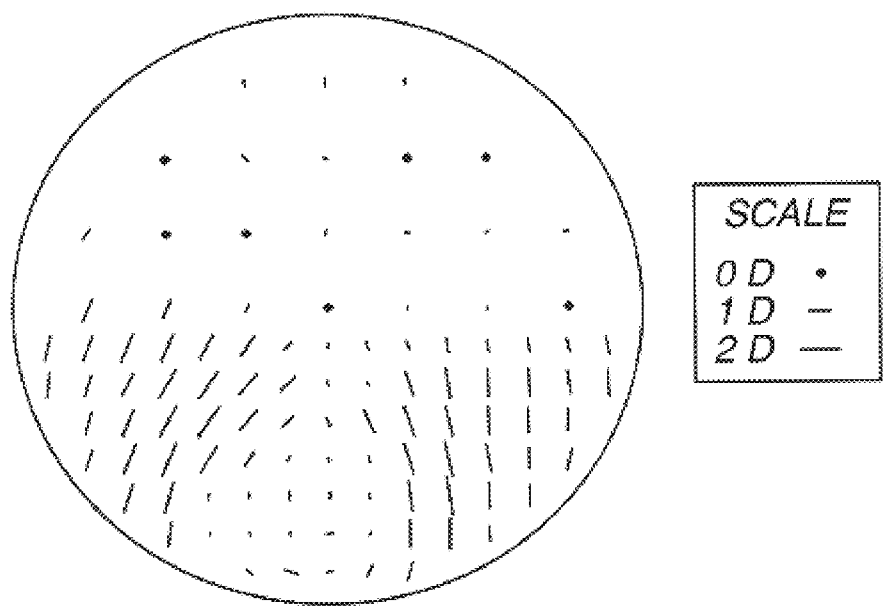
Figure 12A:
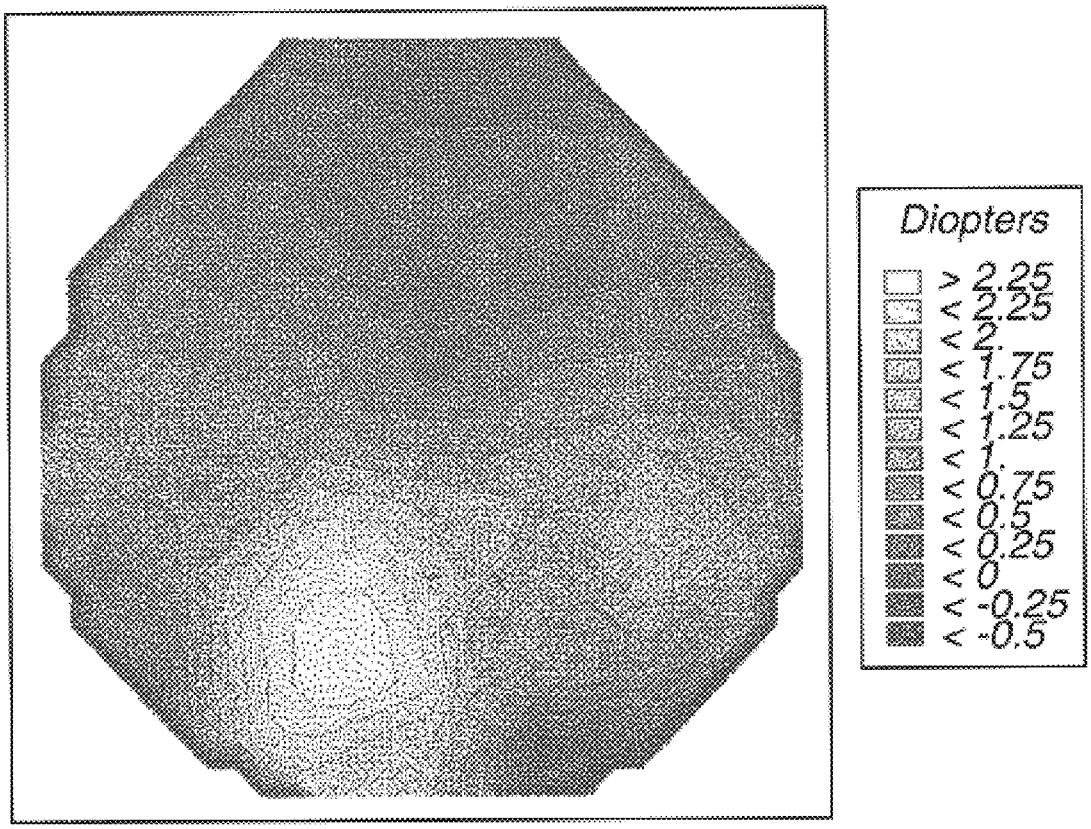
FIGS. 12A, 12B, 12C, 12D, 12E and 12F, respectively, are a contour plot of the best focus power, a contour plot of the astigmatism magnitude, a vector plot of the astigmatism angle, a contour plot of the prism magnitude, a vector plot of the prism angle, and a contour plot of the normalized MTF at 20/20 for LENS B, generated by the EIQM of FIG. 1.
Figure 12B:
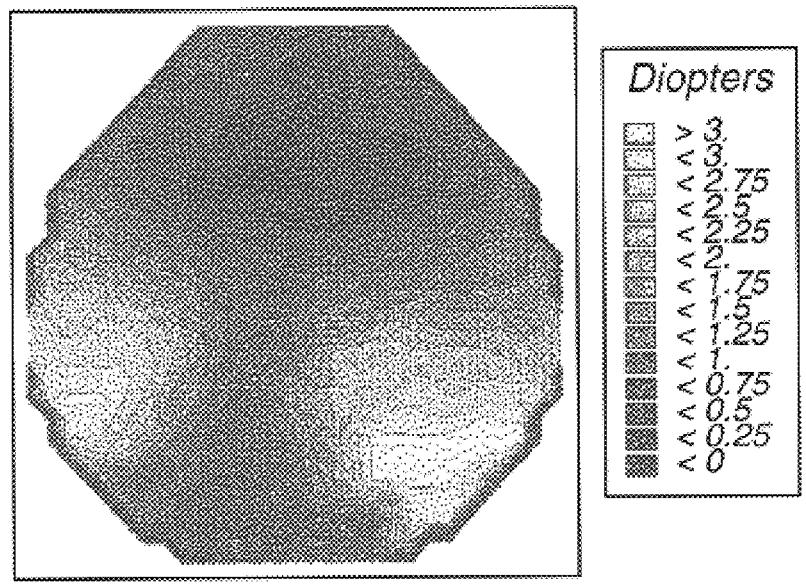
Figure 12C:
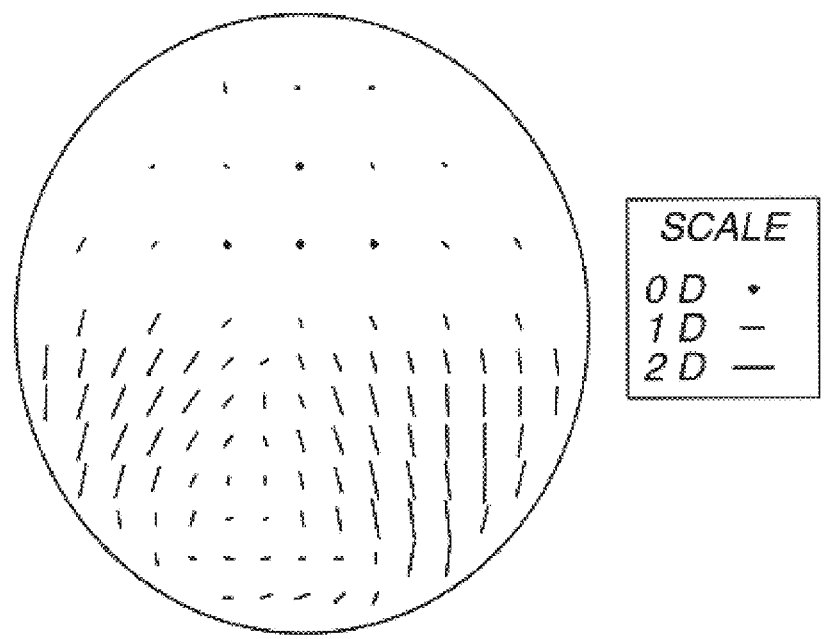

The contour plot in FIG. 12A shows the best-focus power of LENS B over the surface. One can clearly see how the power changes from 0 D in the upper, distance vision zone to slightly over+2 D in the reading, or add, zone in the lower left. The power map for LENS A is quite similar (FIG. 11A). As noted previously, this transition from low to high power produces large amounts of astigmatism. This is clearly evident in the astigmatism magnitude contours shown in FIGS. 11B(LENS A) and 12B (LENS B). One can see that LENS B has a wider area of high astigmatism and more astigmatism in the add zone. The astigmatism vector plots show smooth, continuous transitions of magnitude and angle between the upper and lower portions of the lenses (FIGS. 11C and 12C).

Figure 11D:
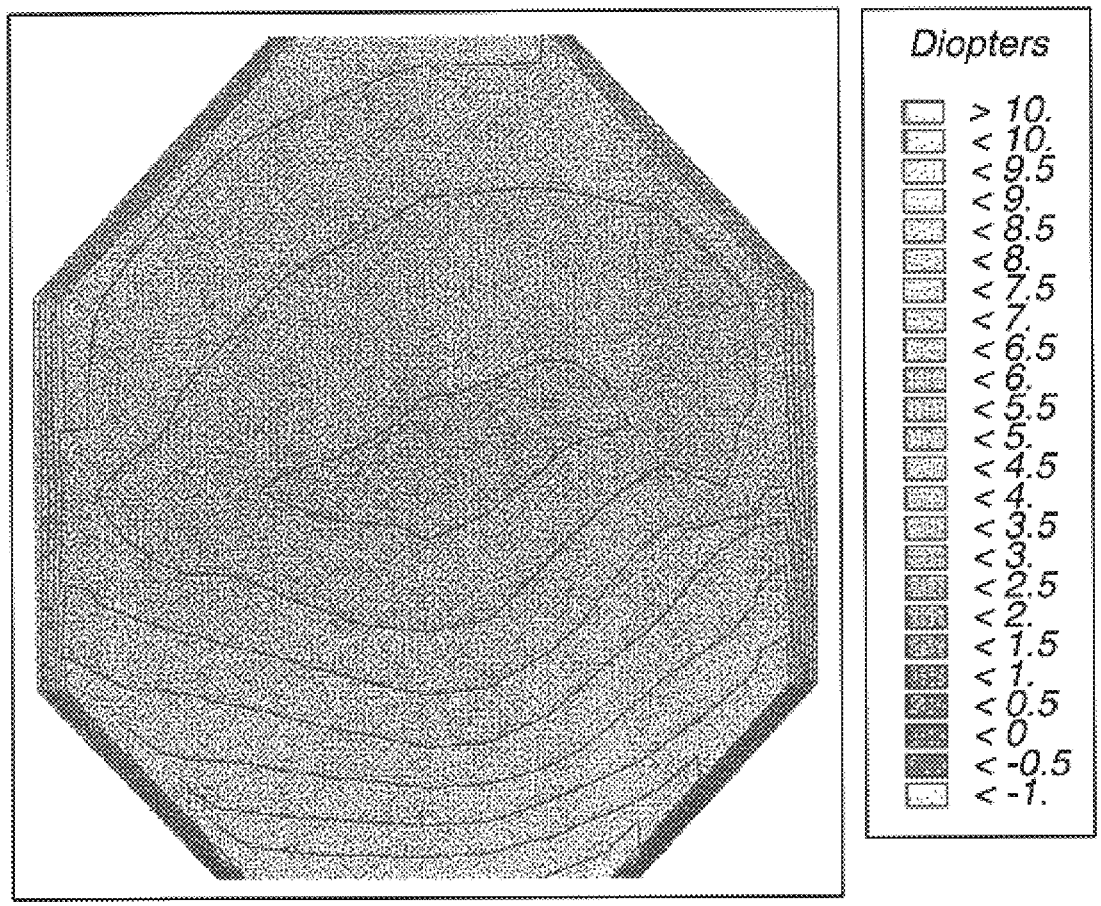
Figure 11E:
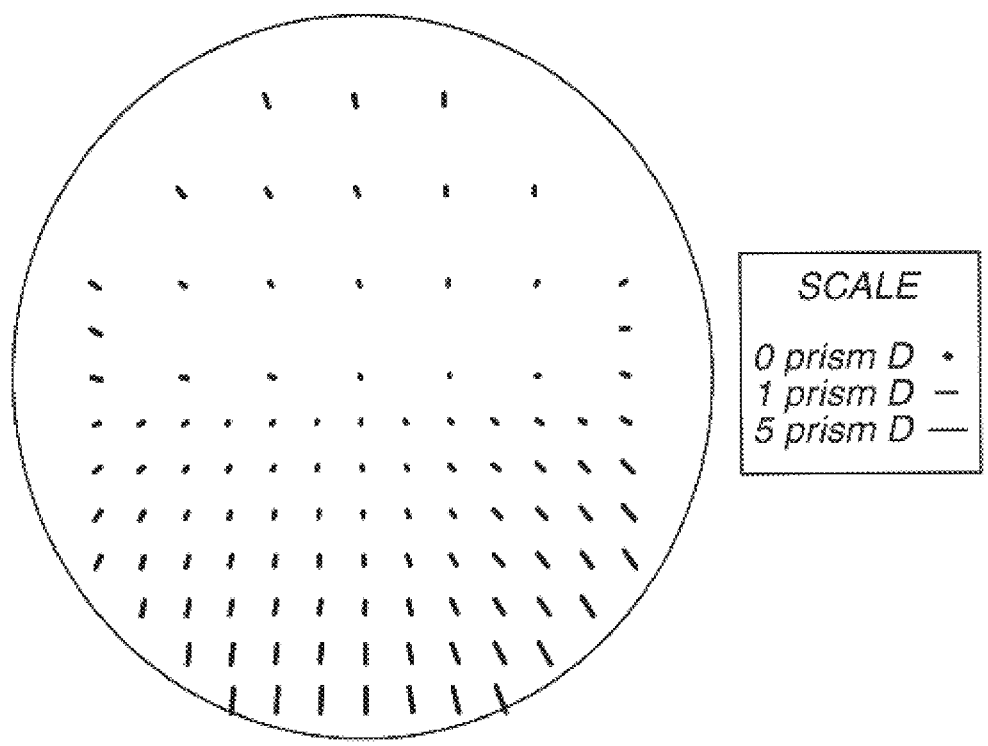
Figure 11F:
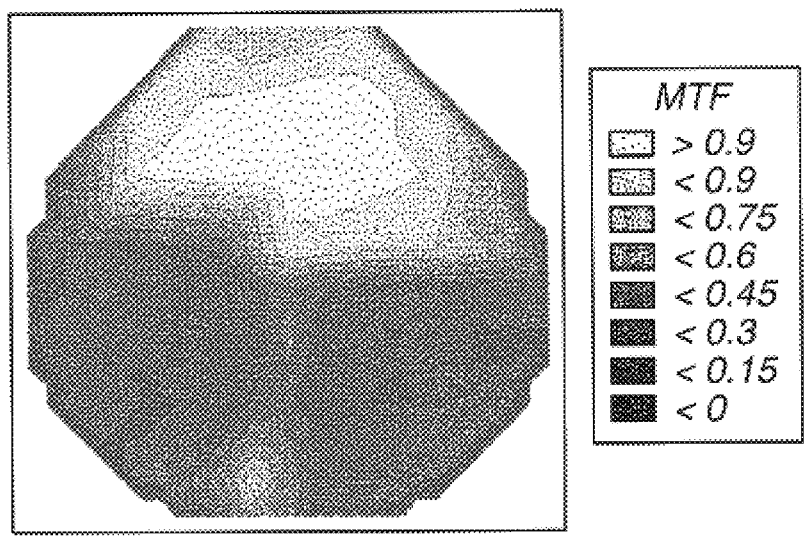
Figure 12D:
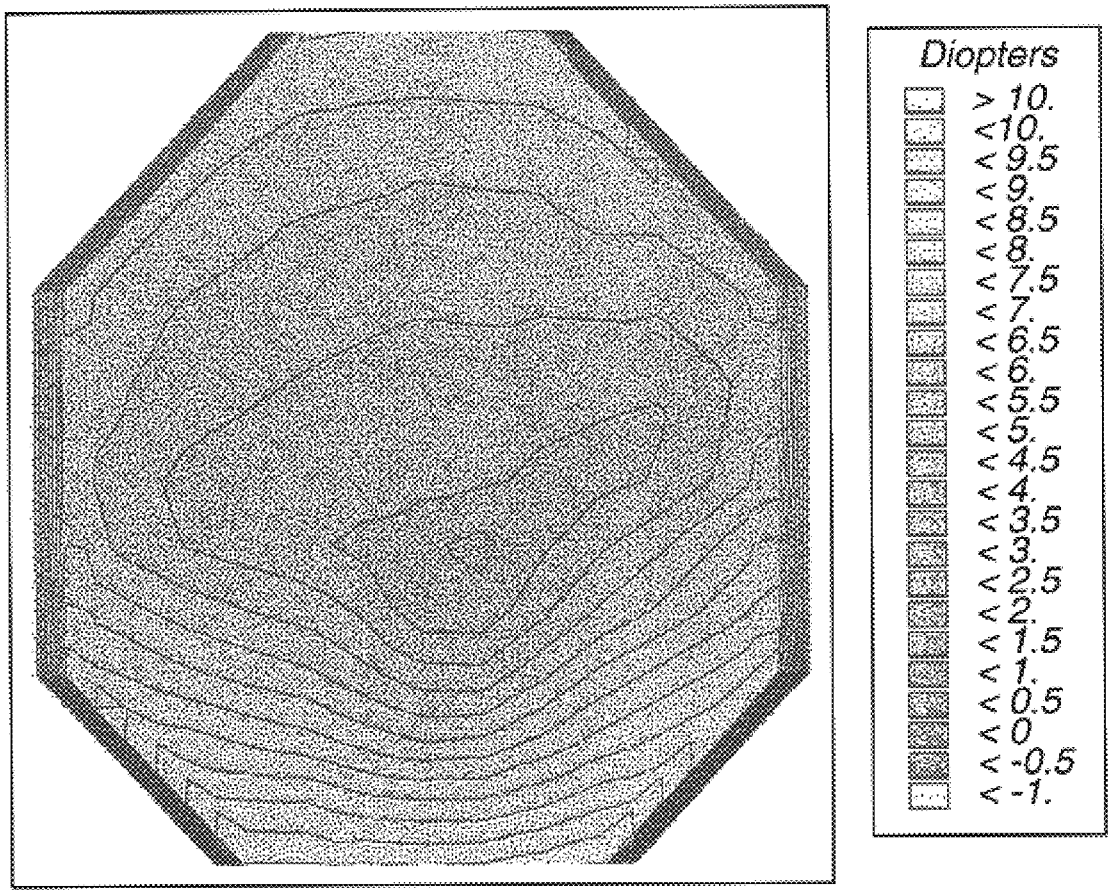
Figure 12E:
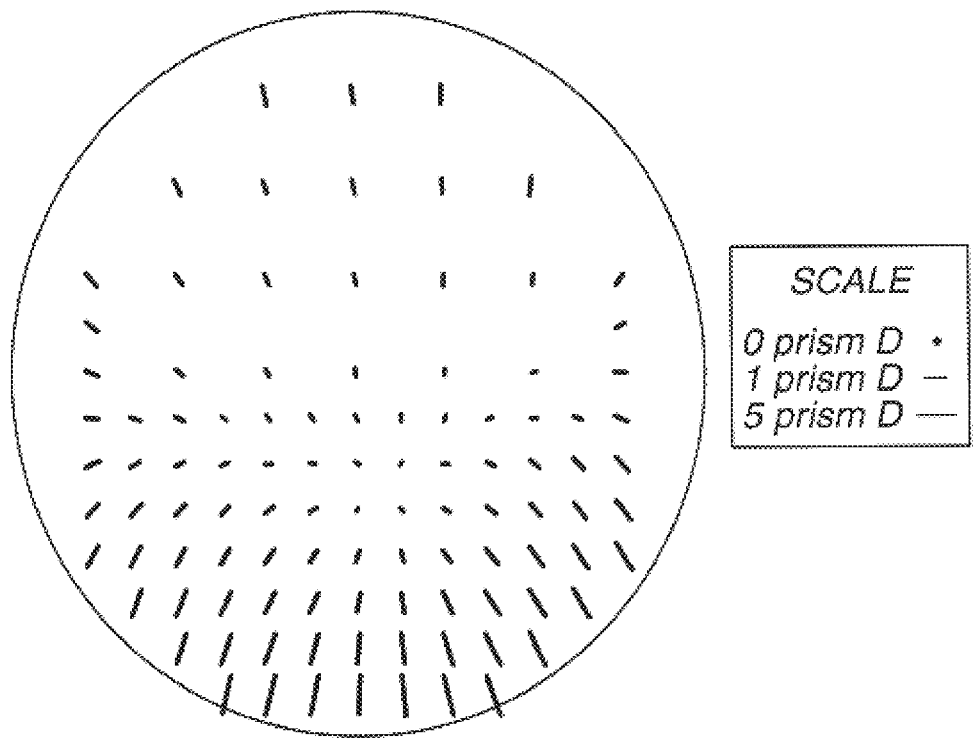
Figure 12F:
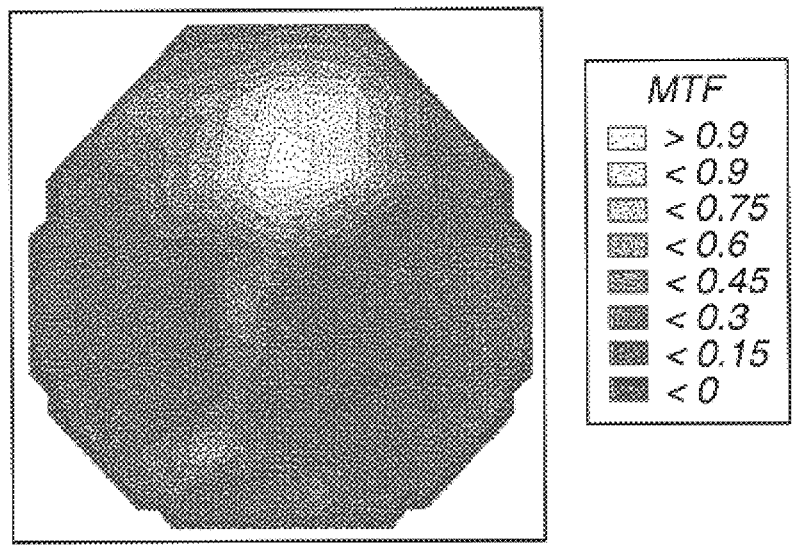

Additionally, from the normalized 20/20 MTF contours shown in FIGS. 11D and 12D, one can see just how much better LENS A performs than LENS B. For LENS A, the MTF is seen to be high in the upper portion of the lens and in the center of the add zone. It drops some in the "channel" connecting these two regions and is very poor in the "wings" on either size of the channel. For LENS B, the high MTF zone in the upper portion is much smaller and does not come back up very much in the add zone.

Figure 13A:
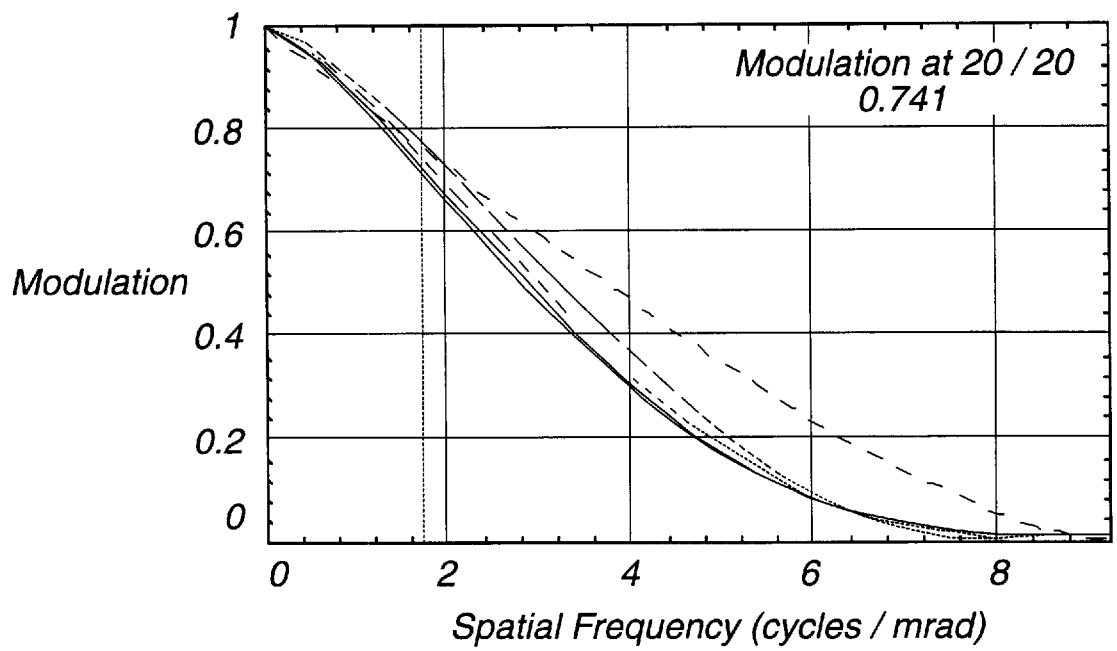
FIGS. 13A and 13B are full plots of the MTF of different subapertures of LENS A, generated by the EIQM of FIG. 1.
Figure 13B:
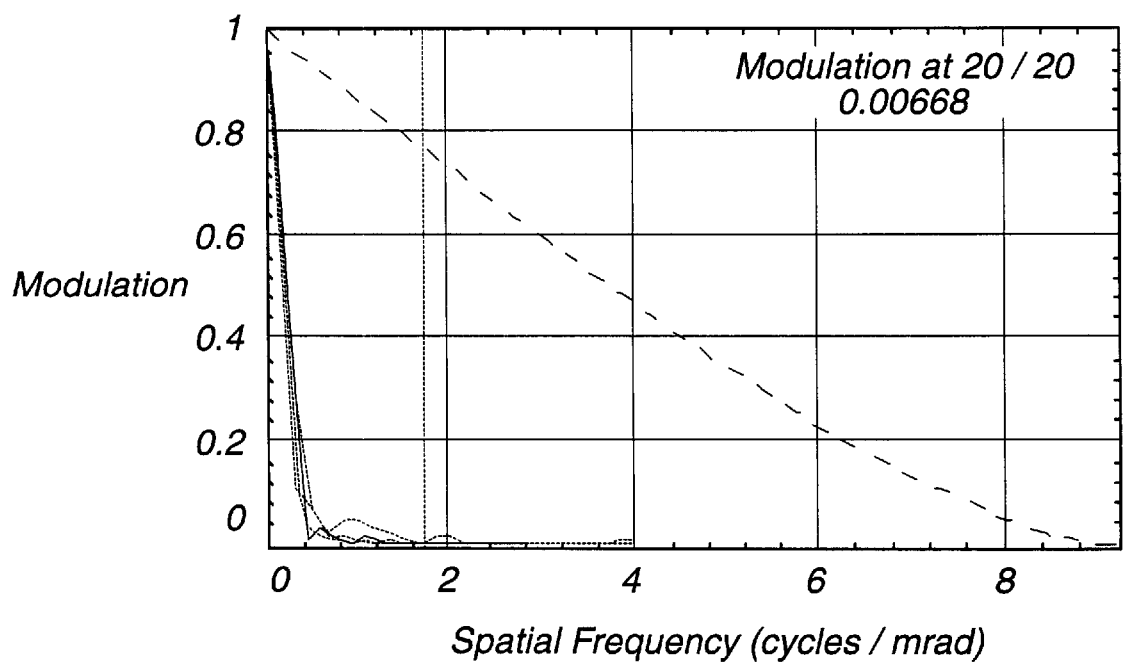

Two full MTF plots for LENS A are shown in FIGS. 13A and 13B. one from a good portion of the distance zone and one from a highly astigmatic region. There are a total of four curves on each plot for slices out of the 3-D MTF at 0, 90 and±45 degrees. The diffraction-limited MTF for a 5 mm pupil diameter at 543 nm is shown as the dashed line.

Figure 14A:
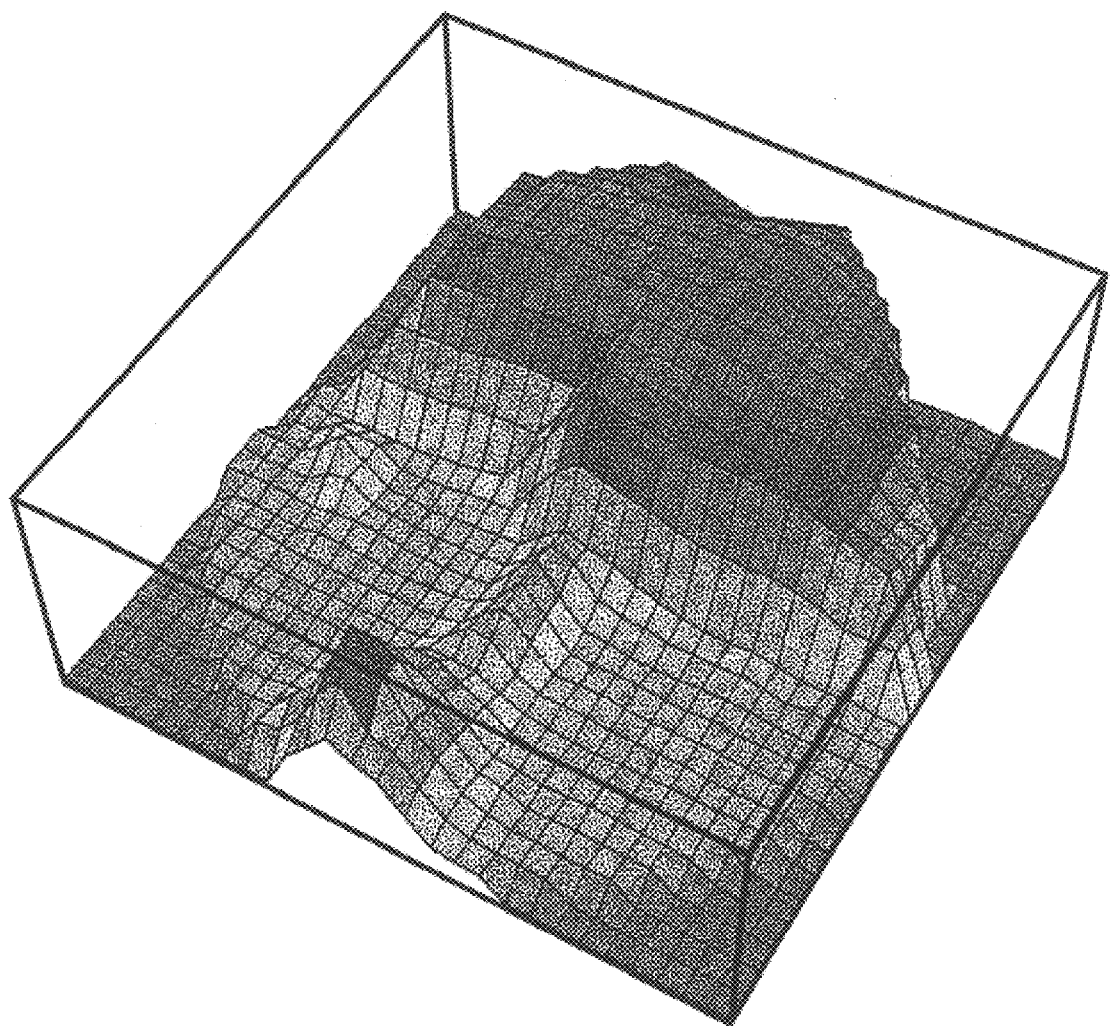
FIGS. 14A, and 14B are, respectively, a three dimensional map of normalized MTF at 20/20, and a numerical plot of normalized MTF at 20/20 versus subaperture location, generated by the EIQM of FIG. 1.
Figure 14B:
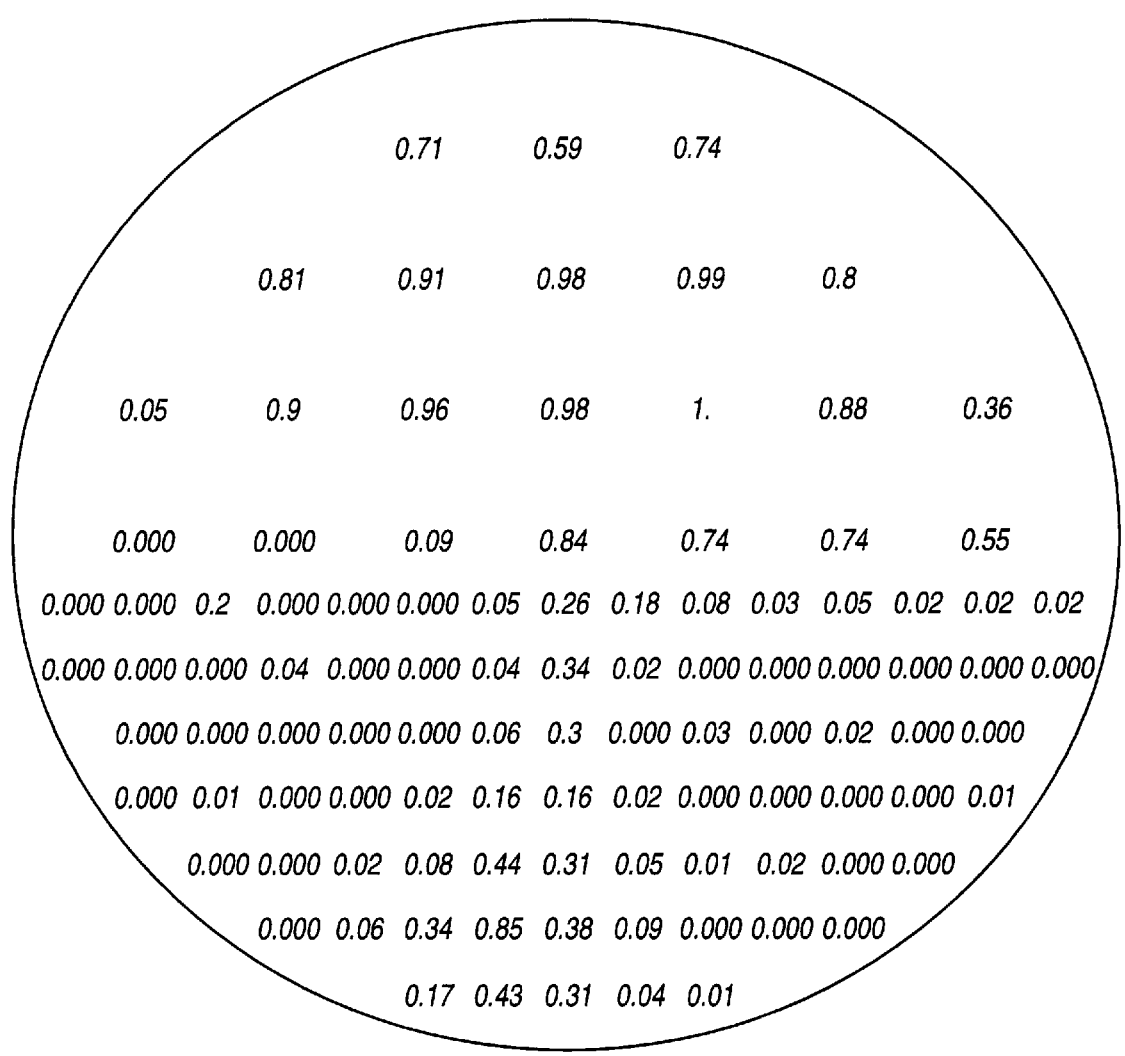

Additional maps and plots that can be automatically generated by the EIQM are shown in FIGS. 14A and 14B. The value of the EIQM is quite apparent from the maps and plots described above, as image quality has been found to change dramatically from one lens design to another. This allows the lens designer, the lens manufacturer, and/or the prescribing doctor to assess accurately and objectively the quality of any given eyeglass lens. Such plots can be generated for any measured quality.

While various embodiments of this invention have been shown and described, it will be apparent to those skilled in the art that many modifications are possible without departing from the inventive concept presented and described herein. For example, although the EIQM was described as being able to measure powers in the range of −0.5 to+2.8 D, the zoom lens can be modified to increase the measurable powers. Additionally, although the EIQM is particularly adapted for measuring the image quality of PALs, it can certainly be used to measure the image quality of any type of eyeglass lens, as long as the power and the astigmatism of the lens are within the measurement range of the system. It is, therefore, to be understood that within the scope of the appended claims, this invention can be practiced otherwise than as specifically described.

What is claimed is:

1. An automated optical testing instrument for measuring the image quality of a lens, the instrument comprising:
    an illumination system for presenting a test beam to the lens;
    a positioning system for rotating the lens so that different areas on the lens are illuminated;
    a detection system for recording and measuring the image quality of the lens; and
    a zoom lens capable of focusing the beam onto the detection system at a constant effective focal length once the beam passes through the lens.

2. The optical testing instrument according to claim 1 wherein the positioning system rotates the lens around a fixed rotation point downstream of the lens.

3. The optical testing instrument according to claim 1 wherein the zoom lens is movable along an optical axis of the system with respect to the lens.

4. The optical testing instrument according to claim 3 wherein the zoom lens comprises a first lens and a second lens, and wherein the second lens is movable along the optical axis with respect to the first lens.

5. The optical testing instrument according to claim 1 wherein the detection system is located at a fixed distance from the lens.

6. The optical testing instrument according to claim 1 further comprising an alignment boom, wherein the zoom lens and the detection system are coupled to the alignment boom, and wherein the alignment boom rotates about the lens to realign the test beam with the detection system as the lens is rotated by the positioning system.

7. The optical testing instrument according to claim 1 further comprising a microprocessor for controlling the operation of the optical testing instrument.

8. The optical testing instrument according to claim 1 wherein the detection system comprises means for automatically measuring the point spread function produced by a location on the lens.

9. The optical testing instrument according to claim 1, further comprising means for automatically calculating the modulation transfer function of a location on the lens.

10. An automated optical testing instrument for measuring the image quality of a lens, the instrument comprising:
    a light source for presenting a test beam to the lens;
    a positioning system for rotating the lens so that different areas on the lens are illuminated in order to measure the image quality of each such area of the lens;
    a detection system for recording and measuring the image quality of the lens;
    a zoom lens for focusing the beam onto the detection system; and
    an alignment boom,
    wherein the zoom lens and the detection system are coupled to the alignment boom, and
    wherein the alignment boom rotates about the lens to realign the test beam with the detection system as the lens is rotated by the positioning system.

11. The optical testing instrument according to claim 10 further comprising a microprocessor for controlling the operation of the optical testing instrument.

12. The optical testing instrument according to claim 11 wherein the positioning system rotates the lens around a fixed rotation point behind the lens.

13. The optical testing instrument according to claim 12 wherein the zoom lens focuses the test beam at a constant effective focal length once the beam passes through the lens.

14. The optical testing instrument according to claim 13 wherein the detection system comprises means for automatically measuring the power, astigmatism, prism and modulation transfer function at a location on the lens.

15. An automated optical testing instrument for measuring the image quality of an eyeglass lens, the instrument comprising:
    an illumination system for presenting a test beam to the lens;
    a positioning system for rotating the lens so that different areas on the lens are illuminated in order to measure the image quality of each such area of the lens;
    a detection system for recording and measuring the image quality of the lens;
    a zoom lens for focusing the beam onto the detection system;
    an alignment boom; and
    a microprocessor for controlling the operation of the optical testing instrument;
    wherein the zoom lens and the detection system are coupled to the alignment boom; and
    wherein the optical testing instrument is capable of measuring the power, astigmatism, prism and modulation transfer function of the lens.

16. The optical testing instrument according to claim 15 wherein the positioning system rotates the lens around a fixed rotation point downstream of the lens.

17. The optical testing instrument according to claim 16 wherein the zoom lens focuses the test beam at a constant effective focal length once the beam passes through the lens.

18. A method for measuring the image quality of an eyeglass lens, the method comprising the steps of:
    (a) illuminating a location on the lens with a test beam from a light source;
    (b) focusing the test beam on a detection system at a constant effective focal length after the beam passes through the location on the lens; and
    (c) measuring the image quality of the location on the lens.

19. The method according to claim 18 further comprising rotating the lens to illuminate a different location on the lens, and
    repeating steps (a) through (c) recited above.

20. The method according to claim 19 wherein the rotating step comprises rotating the lens about a fixed rotation point downstream of the lens.

21. The method according to claim 18 wherein the focusing step comprises rotating the detection system about the lens to realign the test beam with the detection system as the lens is rotated.

22. The method according to claim 21 wherein the focusing step further comprises moving a zoom lens along an optical axis of the system with respect to the lens to keep the effective focal length constant.

23. The method according to claim 18 wherein the measuring step comprises measuring the power, astigmatism, prism and modulation transfer function at the location of the lens.

24. The method according to claim 23 wherein the measuring step further comprises transforming the point spread function to obtain the modulation transfer function at the location of the lens.

25. The method according to claim 18 wherein the measuring step comprises measuring the point spread function at the location of the lens.

26. An automated optical testing instrument for measuring the image quality of a lens, comprising:

an illumination source;

a lens mount that allows the lens to be rotated about two axes, positioned downstream of the illumination source;

a zoom lens capable of focusing light at a constant effective focal point, positioned downstream of the lens mount; and a light detector capable of measuring the point spread function at selected locations of a lens under test, positioned downstream of the zoom lens.

27. The optical testing instrument according to claim 26, capable of simulating the way in which an eyeglass lens is used by the human eye.

28. The optical testing instrument according to claim 27, wherein a lens under test is rotatable about a rotation point 27 mm downstream of the back surface of the lens.

* * * * *